3,377,339
OXIDIZED STARCH AND METHODS FOR PREPARING THE SAME

Keiiti Sisido, Kyoto-shi, Yuji Imai and Yoshinobu Hirasaka, Tokyo, and Kiyoshi Inoue, Urawa-shi, Japan, assignors to Chugai Seiyaku Kabushiki Kaisha, Chuo-ku, Tokyo, Japan, a corporation of Japan
No Drawing. Filed Feb. 1, 1965, Ser. No. 429,605
Claims priority, application Japan, Feb. 25, 1964, 39/9,349
5 Claims. (Cl. 260—233.3)

ABSTRACT OF THE DISCLOSURE

A process for oxidizing starch with nitric acid and an oxygen-containing gas.

---

The present invention relates to oxidized starch and methods for preparing the same, particularly to the method for preparing the oxidized starch by oxidizing starch with nitric acid.

Oxidized starch is useful as a raw material, for example, for a synthesis of oxidized starch sulfate which exhibits blood anticoagulating action similar to heparin like substance. Oxidized starch is also a raw material for the preparation of medically useful glucuronic acid by hydrolysis.

In the production of oxidized starch by the oxidation of starch with nitric acid, nitric acid is used in several concentrations. For example, in German Patent No. 849,692 and U.S. Patent No. 2,650,237 about 70% or more of concentrated nitric acid is used. According to Japanese Patent No. 241,792 the concentration of nitric acid is successfully reduced to 65%–45%. Further, Japanese patent publications, Nos. 12,114/61, 8,113/63 and 14,566/63 disclose the oxidation of starch by the joint use of less than 40% of nitric acid and about 10% of sulfuric acid.

These prior art oxidizing methods require specific temperature and time for oxidation reaction, amounts of oxidizing agents, catalysts, and the like, since nitric acid may show by its concentration different side reactions such as oxidation, dissolution, hydrolysis and the like.

As the concentration of nitric acid in the reaction solution is decreased with the advance of the oxidation reaction the reaction of conditions would be substantially varied every time the oxidation is carried out under given oxidation condition to give a mixture of oxidized products having different properties. Therefore it is an ideal method to change the reaction condition such as, temperature wherever the concentration of nitric acid decreases. In general, this method is not only hardly expected to be conducted correctly but is also accompanied by complicated operations so that it cannot be said to be a superior one. According to the conventional method, the quality of oxidized starch obtained is deteriorated, for example, in case glucuronolactone is produced by hydrolysis of the oxidized starch decrease of the yield in the crystalline state is accompanied. In particular this trend is remarkable when low concentrated nitric acid is used so that a large amount of oxidizing agent, generally, is required to be used. In these methods about two or more mols of nitric acid for each glucose unit of starch are required. In case of low concentrated nitric acid being used, in particular, the smooth progress of the reaction would be considerably disturbed and oxidised starch of superior quality cannot be expected to be produced owing to an insufficiency of oxidizing agent.

Furthermore, in the reactions under normal pressure, waste gases, particularly nitrogen monoxide having no oxidizing power is produced in the form of fine bubbles and then the volume of oxidized solution would increase in general, up to 3–4 times the charged amount so that uniform reaction may be prevented by being accompanied by a hard to control heat of reaction, and thereby a large volume of a reaction kettle is required.

The object of the present invention is to eliminate such disadvantages in conventional methods and to produce advantageously oxidized starch. The present invention relates to a method for preparing oxidized starch by oxidizing starch with nitric acid characterized by the oxidization reaction being carried out under pressure in the presence of any one of the oxygen or oxygen-containing gas.

According to the present invention it is preferable that oxygen is contained in the amount of more than 10% v./v. of the oxygen-containing gas. Air may be used as the oxidizing agent. In practice of the present invention, nitric acid is recovered in the form of nitrogen dioxide every time it is consumed and returned back again into the reaction solution. That is to say, nitrogen dioxide derived from the used nitric acid oxidizes the primary alcohol group of starch selectively and is converted to nitrogen monoxide, which is at once oxidized to nitrogen dioxide by means of the oxygen supplied and in low concentrated nitric acid it is further reacted with water to produce nitric acid.

In this case the nitrogen monoxide which emerges out of the reaction system owing to its low solubility, may be effectively oxidized under pressure to nitrogen dioxide. Comparing this method with the method in which oxygen or oxygen-containing gas is passed through the oxidizing solution at normal pressure, a higher efficiency may be expected. Further, nitrogen dioxide may be advantageously dissolved under pressure in an oxidizing solution in a more highly concentrated state, thereby selective oxidizing action may be increased. As a result the effective concentration of nitric acid in the oxidizing solution would be kept nearly at a fixed concentration and the primary alcohol group of starch may be uniformly and promptly oxidized. Owing to the continuous recovery of nitric acid during the reaction and repeated utilization thereof, the amount of nitric acid to be used may be largely decreased to such an extent that even if the amount of nitric acid is reduced to the order of 0.8 mol to a glucose unit of starch, highly pure oxidized starch may be obtained. If nitric acid is used in nearly the same amount as in the conventional method the reaction time may be shortened and the yield of crystalline glucuronolactone obtainable by hydrolysis, for example, it may be considerably increased, as compared with the conventional oxidation at normal pressure. The yield of glucuronolactone obtained by hydrolysis of oxidized starches prepared by hitherto known methods and the present invention is shown in the following table.

| Experiment number | Concentration of nitric acid (percent) | Amount of nitric acid used (mol/mol) | Oxidation temperature (°C.) | Pressing agent | Pressure (kg./cm.²) | Oxidation time (hour) | Yield of crystalline glucurolactone (percent) |
|---|---|---|---|---|---|---|---|
| 1 | 40 | 2.0 | 50 | None | None | 12 | 3.0 |
| 2 | 40 | 1.5 | 50 | Oxygen | 5–10 | 10 | 6.6 |
| 3 | 40 | 2.0 | 50 | ...do... | 10–20 | 8 | 8.6 |
| 4 | 50 | 1.0 | 50 | None | None | 12 | 8.4 |
| 5 | 50 | 0.8 | 50 | Oxygen | 15–20 | 10 | 10.1 |
| 6 | 50 | 1.0 | 50 | ...do... | 15–20 | 8 | 13.6 |
| 7 | 60 | 1.5 | 40 | None | None | 8 | 10.2 |
| 8 | 60 | 1.0 | 40 | Air | 15–30 | 7 | 12.9 |
| 9 | 60 | 1.5 | 40 | ...do... | 15–30 | 6 | 15.2 |

NOTES.—(1) Yield of crystalline glucuronolactone is based upon starch.
(2) Condition of hydrolysis: 2% sulfuric acid, 120–130° C., 90 minutes.
(3) In number 4, oxygen is passed through oxidizing solution during the reaction.

As it is clear from the description above, according to the present invention it is possible to reduce remarkably the amount of nitric acid to be used, to shorten the oxidation time, to decrease the volume of the reaction kettle and to increase the selective oxidizing action, thereby the purity of oxidized starch may be improved, compared with the conventional methods.

Now the present invention will be more concretely explained as follows: It is preferable that one mol of starch is added to the amount of 0.8–3.0 mol of 30–70% nitric acid containing a small amount of alkali nitrite, for example, sodium nitrite as catalyst. The mixture is stirred at 25–60% C. to make the reaction solution uniform. Thereafter the reaction solution is placed under pressure by introduction of oxygen or oxygen-containing gas. In order to avoid sudden outbreak of the reaction, it is preferable to adopt at first comparatively low pressure and to increase gradually the pressure. After no remarkable absorption of oxygen has been observed the reaction is stopped. If the reaction solution is poured into a solvent such as methanol and ethanol, the oxidized starch may be obtained in powdery state. Further if nitric acid remaining in the oxidized solution is removed by heating according to the conventional methods or is destroyed by reducing agent such as formaldehyde the oxidized starch solution may be obtained.

The present invention is explained more in detail by way of examples as follows:

Example 1

A mixture of 250 g. of potato starch (about 18% water content) and 7.5 g. of sodium nitrite is little by little added to 365 g. of 40% nitric acid at 50° C. under stirring in the autoclave. After about 30 minutes oxygen is passed to remove air and then the pressure in the autoclave is kept at about 6 kg./cm² by gradual increase of pressure. Consumption of oxygen is particularly remarkable within about 4 hours after beginning of the reaction. The pressure is gradually raised up to 10 kg./cm² and the reaction is continued at 50° C. under stirring. After 10 hours the pressure is eliminated to normal pressure and 120 g. of 37% formalin is added little by little. The temperature is gradually raised up to 95° C. after about 60 minutes. At this temperature heating is continued for 60 minutes, whereupon viscous oxidized starch solution may be obtained. Specific rotation $$(\alpha)_D^{20} = +142.0°$$

(as starch C=1:201, water). Glucuronic acid residue content: 46.8%.

(Glucuronic acid residues content is calculated from the total amount of furfural which is produced by hydrolysis of oxidized starch with 14% hydrochloric acid and continually extracted with xylene. The above mentioned method to determine the glucuronic acid residues in nitric acid-oxidized starch is reported in the Pharmaceutical Society of Japan, vol. 83, No. 11, pp. 1073–1077).

Example 2

A mixture of 250 g. of potato starch identical with that in Example 1 and 5.0 g. of sodium nitrite is little by little added to 486 g. of 40% nitric acid at 50° C. under stirring in the autoclave. After about 30 minutes oxygen is passed to remove air at first and then the pressure is gradually raised up to about 12 kg./cm². Thereafter the pressure is further raised up to 20 kg./cm.² to react at 50° C. for 8 hours. After elimination of pressure the oxidized solution is added in drop-wise to about 10 times volume of ethanol, whereupon the oxidized starch may be obtained in the state of a powder. Yield is 220.2 g. Specific rotation $(\alpha)_D^{20} = +175.6°$ (C.=1.302, water). Glucuronic acid residue content: 48.2%.

Example 3

A mixture of 250 g. of potato starch identical with that in Example 1 and 5.0 g. of sodium nitrite is little by little added to 194 g. of 50% nitric acid at 50° C. under stirring in the autoclave. After about 30 minutes oxygen is passed to remove air at first and then the pressure is gradually raised up to about 15 kg./cm.² and further raised up to 20 kg./cm.² for 3 hours. After reaction for 8 hours at 50° C. the pressure is removed and 80 g. of 37% formalin is added little by little to the reaction mixture and the mixture is gradually heated. After 60 minutes, the temperature is made 95° C. and the reaction product is further heated at said temperature for 60 minutes to give oxidized starch solution. Specific rotation $(\alpha)_D^{20} = +155.0°$ (C.=1.352 as starch, water). Glucuronic acid residue content: 49.7%.

Example 4

A mixture of 250 g. of potato starch identical with that in Example 1 and 2.5 g. of sodium nitrite is little by little added to 162 g. of 60% nitric acid at 40° C. under stirring in the autoclave. After about 30 minutes the pressure in the autoclave is raised up to about 20 kg./cm.² by introduction of air. Further the pressure is raised up to 30 kg./cm.² for about 3 hours with removing nitrogen remained. The mixture is reacted at 40° C. for total 7 hours. After removing of air oxidized solution is added in drop-wise to 10 times volume of methanol, whereupon oxidized starch deposits in the state of powder. Yield 231 g. Specific rotation $$(\alpha)_D^{20} = +180.3°$$

(C.=1.763, water). Glucuronic acid residue content: 50.6%.

We claim:
1. A process for oxidizing starch which comprises the steps of:
   (A) treating such starch with 30–70% nitric acid in the amount of from 0.8 to 3.0 mols per glucose unit of starch at a temperature between 25° and 60° C. in an autoclave;
   (B) adding an oxygen-containing gas in an amount sufficient to create a pressure between 10 and 30 kg./cm.²; and
   (C) recovering the oxidized starch thus formed.
2. A process according to claim 1, which includes the further step of introducing an alkali nitrite into the oxidation reaction.
3. A process according to claim 1, in which said oxygen-containing gas is effectively pure oxygen.

4. A process according to claim 1, in which said oxidized starch is recovered by pouring the reaction mixture into a lower alkanol and recovering the precipitate.

5. A process according to claim 1, which comprises the further step of treating said reaction mixture with a reducing agent to decompose the nitric acid and wherein said treated reaction mixture is heated to yield an aqueous solution of oxidized starch.

References Cited

UNITED STATES PATENTS 3,007,917  11/1961  Pauling _____ 260—212

DONALD E. CZUJA, *Primary Examiner.*

R. W. MULCAHY, *Assistant Examiner.*